(12) United States Patent
Hazzani

(10) Patent No.: US 8,258,945 B2
(45) Date of Patent: Sep. 4, 2012

(54) SYSTEMS AND METHODS FOR VERIFICATION OF WIRELESS TERMINALS ON BOARD VEHICLES USING COUNTRY-OF-ORIGIN INFORMATION

(75) Inventor: Gideon Hazzani, Rishon Le Zion (IL)

(73) Assignee: Verint Americas, Inc., Roswell, GA (US)

( * ) Notice: Subject to any disclaimer, the term of this patent is extended or adjusted under 35 U.S.C. 154(b) by 664 days.

(21) Appl. No.: 12/497,793

(22) Filed: Jul. 6, 2009

(65) Prior Publication Data

US 2010/0013633 A1 Jan. 21, 2010

(30) Foreign Application Priority Data

Jul. 20, 2008 (IL) .......................................... 192918

(51) Int. Cl.
*G08B 21/00* (2006.01)
(52) U.S. Cl. ................ 340/540; 340/568.1; 340/539.13; 235/384
(58) Field of Classification Search .................. 340/500, 340/540, 568.1, 425.5, 945, 984, 539.13; 455/410, 411; 235/375, 384, 385
See application file for complete search history.

(56) References Cited

U.S. PATENT DOCUMENTS

| | | | |
|---|---|---|---|
| 6,819,245 B1 | 11/2004 | Dilling | |
| 2004/0185875 A1 | 9/2004 | Diacakis et al. | |
| 2005/0236478 A1* | 10/2005 | St. Clair et al. | ............... 235/384 |

FOREIGN PATENT DOCUMENTS

WO 2010116292 A2 10/2010

OTHER PUBLICATIONS

3GPP TS 24.008 v3.8.0, "3rd Generation Partnership Project; Technical Specification Group Core Network; Mobile radio interface layer 3 specification; Core Network Protocols—Stage 3," Release 1999, (Jun. 2001), 442 pages.
Asokan, N., et al., "Man-in-the-Middle in Tunneled Authentication Protocols," Draft version 1.3 (latest public version: http://eprint.iacr.org/2002/163/, Nov. 11, 2002, 15 pages.
Vedaldi, Andrea, "An implementation of SIFT detector and descriptor," University of California at Los Angeles, 7 pages, 2008.
Girardin, Fabien, et al., "Detecting air travel to survey passengers on a worldwide scale," Journal of Location Based Services, 26 pages, 2008.
Meyer, Ulrike, et al., "On the Impact of GSM Encryption and Man-in-the-Middle Attacks on the Security of Interoperating GSM/UMTS Networks," IEEE, 2004, 8 pages.

* cited by examiner

*Primary Examiner* — Jeffery Hofsass
(74) *Attorney, Agent, or Firm* — McKeon, Meunier, Carlin & Curfman

(57) ABSTRACT

A security method and system for accepting identity information regarding a vehicle. The system intercepts communications between wireless communication terminals located on board a vehicle and a wireless communication network, and processes the intercepted communication so as to identify respective countries of origin of the terminals on the vehicle. A comparison is made between the countries of origin of the terminals and identity information of the vehicle to invoke an action. For example, the comparison may include detecting an inconsistency between the identity information of the vehicle and one or more of the countries of origin of the terminals.

20 Claims, 3 Drawing Sheets

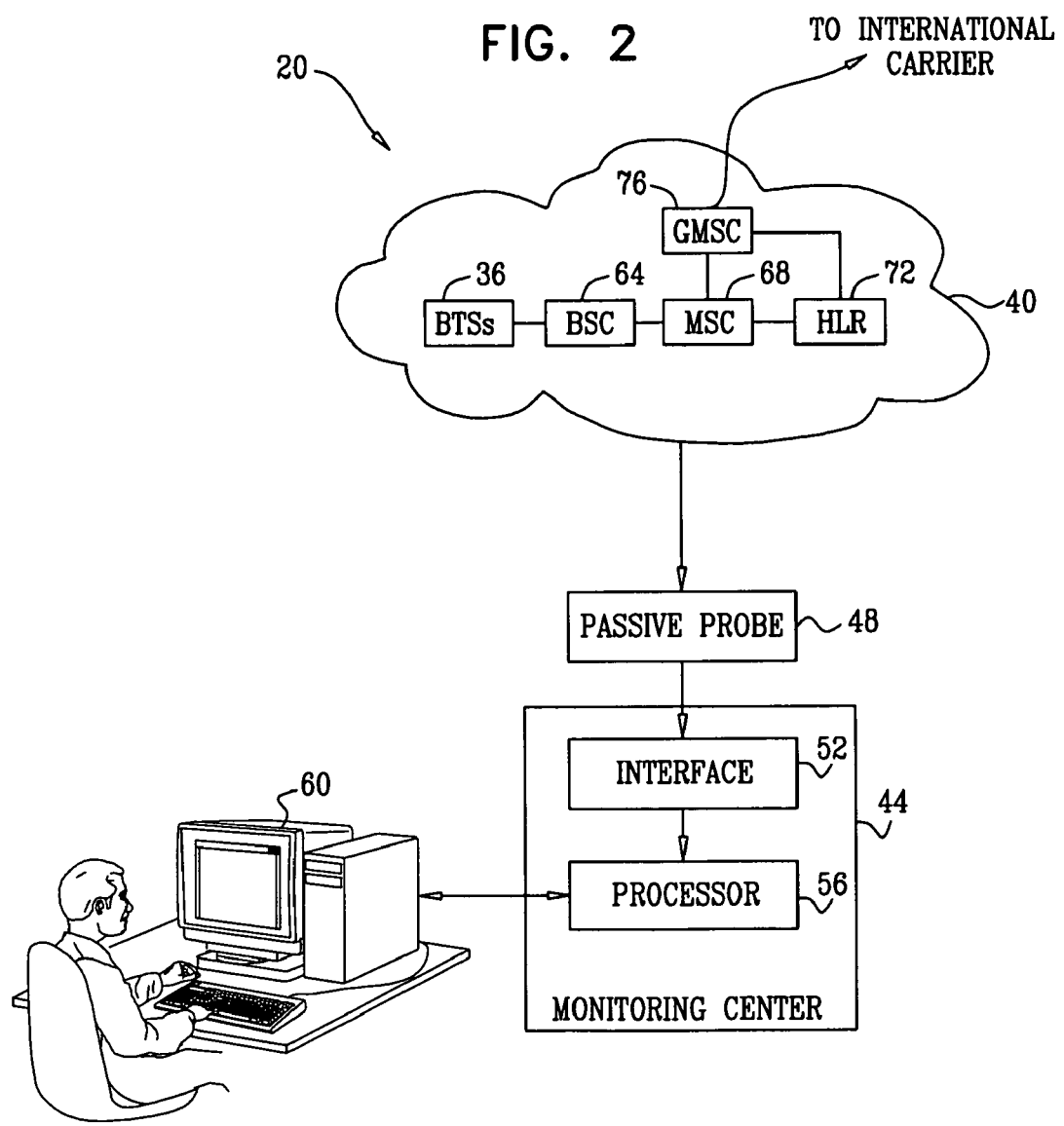

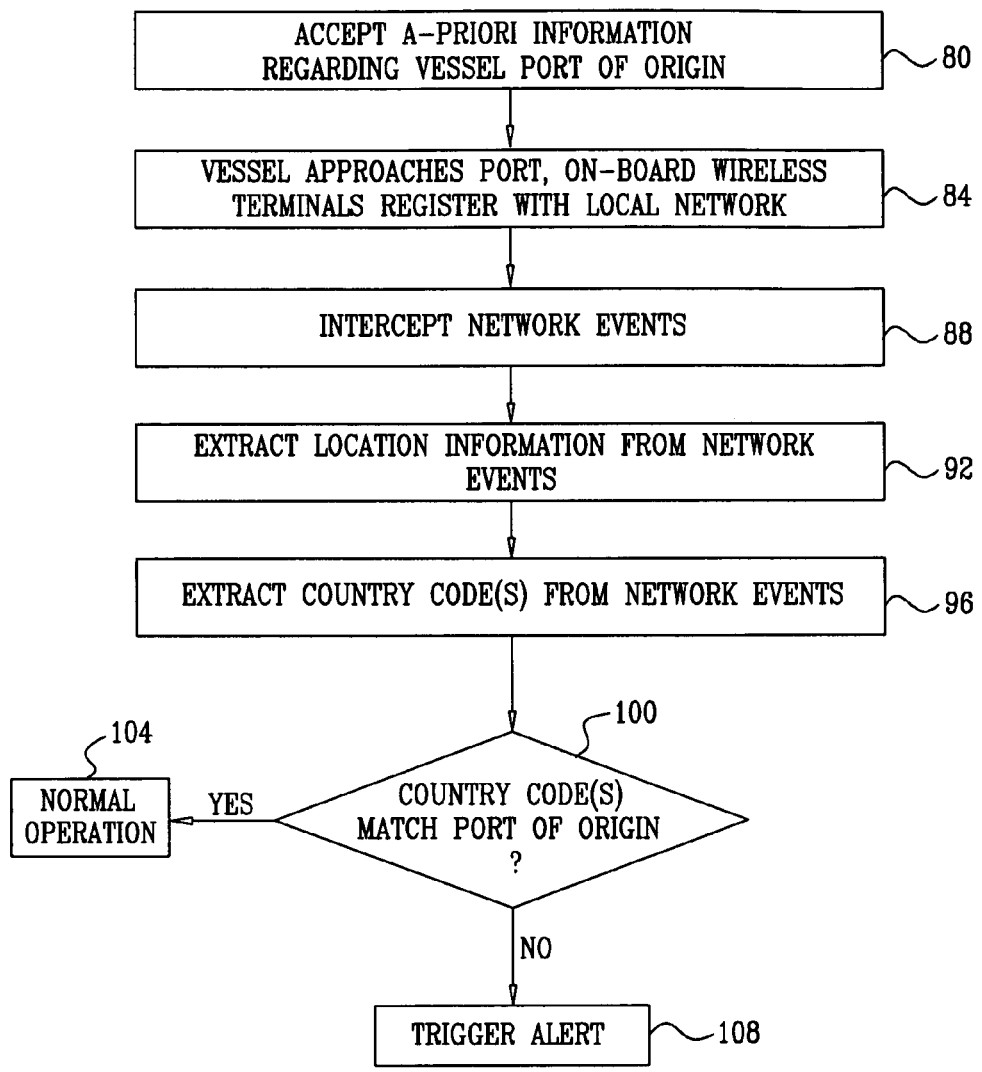

SYSTEMS AND METHODS FOR VERIFICATION OF WIRELESS TERMINALS ON BOARD VEHICLES USING COUNTRY-OF-ORIGIN INFORMATION

FIELD OF THE DISCLOSURE

The present disclosure relates generally to security systems, and particularly to methods and systems for verifying wireless communication terminals on board vehicles.

BACKGROUND OF THE DISCLOSURE

Various security, surveillance and intelligence systems use passive probing techniques for intercepting network events occurring in wireless communication networks. Network events are generated, for example, when a mobile wireless terminal registers with a network, initiates or accepts calls, moves from one cell to another and/or performs various other types of actions in the network. Network events can be used in a variety of ways to collect information related to wireless terminals and their users.

SUMMARY OF THE DISCLOSURE

An embodiment that is described herein provides a security method, including:

accepting identity information regarding a vehicle;

intercepting communication between one or more wireless communication terminals located on board the vehicle and a wireless communication network;

processing the intercepted communication so as to identify respective countries of origin of the terminals;

making a comparison between the countries of origin of the terminals and the identity information of the vehicle; and invoking an action responsively to the comparison.

In some embodiments, making the comparison includes detecting an inconsistency between the identity information of the vehicle and one or more of the countries of origin of the terminals.

In an embodiment, processing the intercepted communication includes processing network events occurring in the wireless communication network responsively to the communication. Typically, processing the network events includes extracting from the network events first information indicative of locations of the terminals, and further extracting from the network events second information indicative of the countries of origin of the terminals. In a disclosed embodiment, the first information includes one of a Serving Area Identifier (SAI) and a cell identifier (CELL_ID) specified in the network events. In another embodiment, the second information includes Country Code (CC) fields of International Mobile Subscriber Identities (IMSI) specified in the network events.

In another embodiment, processing the network events includes extracting the first and second information pertaining to a given terminal from first network events sent over a first interface in the wireless communication network, and extracting a Mobile Systems International Subscriber Identity Number (MSISDN) of the given terminal from second network events sent over a second interface in the wireless communication network, which is different from the first interface.

Processing the network events may include correlating a first subset of the first network events with a second subset of the second network events. In some embodiments, the network events in the first and the second subsets specify an identifier of the given terminal, and correlating the first subset with the second subset includes associating the first and second subsets responsively to the identifier. The identifier may include an International Mobile Subscriber Identity (IMSI).

In some embodiments, invoking the action includes outputting an alert responsively to the comparison. Additionally or alternatively, invoking the action may include invoking the action in response to detecting that one or more of the countries of origin of the terminals is hostile.

There is additionally provided, in accordance with an embodiment that is described herein, a security apparatus, including:

a network interface, which is connected to a wireless communication network and is operative to intercept communication between one or more wireless communication terminals located on board a vehicle and the wireless communication network; and a processor, which is coupled to accept identity information of the vehicle, to process the intercepted communication so as to identify respective countries of origin of the terminals, to make a comparison between the countries of origin of the terminals and the identity information of the vehicle, and to invoke an action responsively to the comparison.

The present disclosure will be more fully understood from the following detailed description of the embodiments thereof, taken together with the drawings in which:

BRIEF DESCRIPTION OF THE DRAWINGS

FIG. 2 is a block diagram that schematically illustrates a port security system, in accordance with an embodiment of the present disclosure; and FIG. 3 is a flow chart that schematically illustrates a method for verifying identities of wireless terminals on-board a vessel, in accordance with an embodiment of the present disclosure.

DETAILED DESCRIPTION OF EMBODIMENTS

Overview

Figure 1:
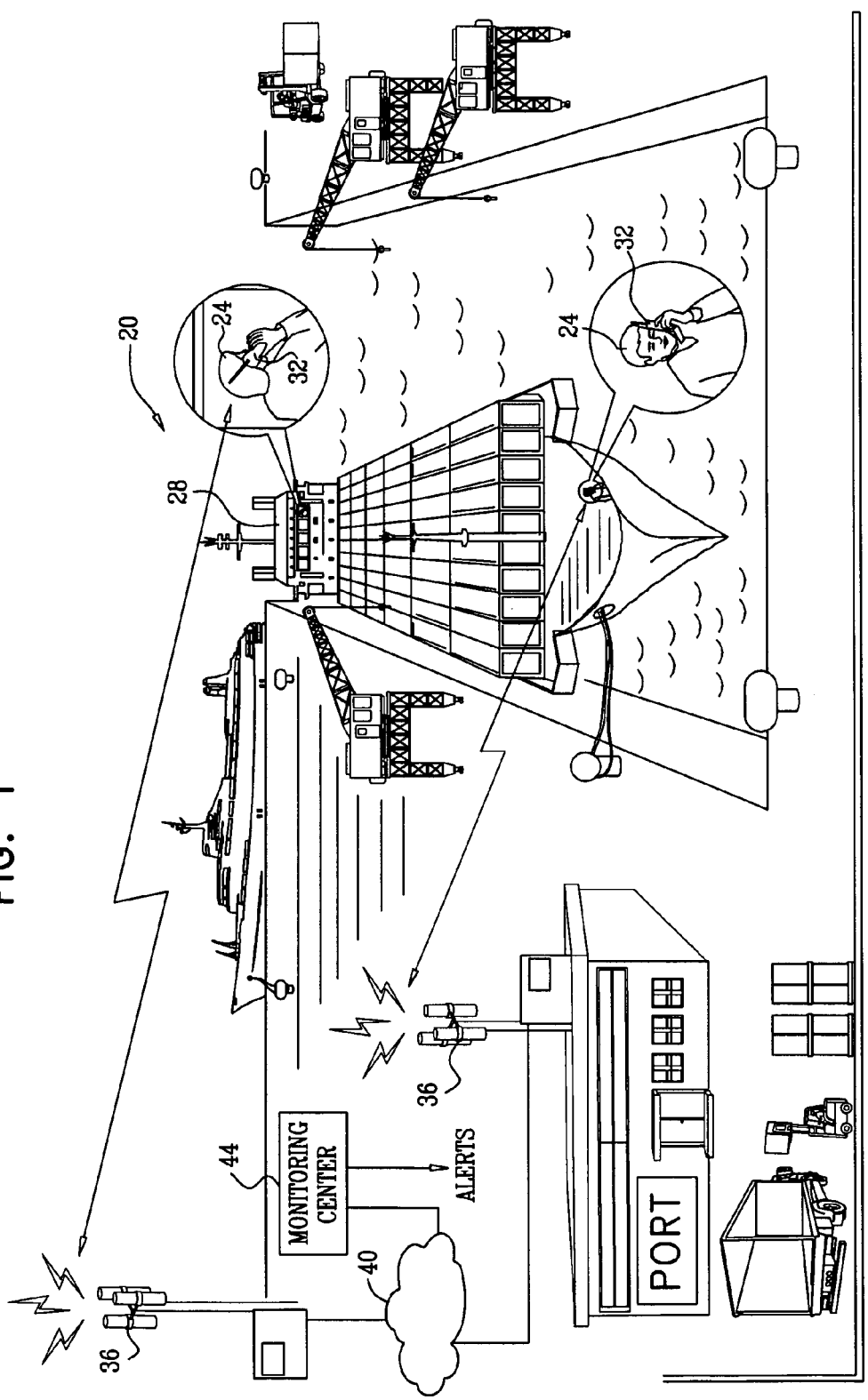
FIG. 1 is a schematic, pictorial illustration of a port security system, in accordance with an embodiment of the present disclosure.

In various security applications it is desirable to remotely and automatically verify the identities of individuals located on board vehicles, and to detect potentially-suspicious scenarios. Such a verification process can be performed, for example, on ships that approach or dock at a port or on aircraft landing in an airport.

Embodiments that are described hereinbelow provide methods and systems for verifying the identities of users of wireless terminals on board a vehicle, by intercepting communications between the on-board terminals and a wireless communication network. The embodiments described herein refer to a security system that is deployed in a seaport and verifies the identities of passengers on board vessels such as ships, but the principles of the present disclosure can also be applied to vehicles of other sorts, such as aircraft, trains or buses.

In some embodiments, a monitoring center uses the intercepted communications to recognize on-board terminals, and to automatically identify the country of origin of each terminal. The monitoring center then compares the countries of origin of the on-board terminals with a-priori identity information regarding the vessel, such as the vessel's port of origin. If the countries of origin of the on-board terminals do not match the identity information of the vessel, the monitoring center issues an alert and/or invokes appropriate action.

For example, if a vessel originating from country X has on board multiple terminals originating from country Y, the situation may call for special attention or additional security measures. Various exemplary criteria that can be used by the monitoring center in determining whether the countries of origin of the on-board terminals match the identity of the vessel are described herein.

In a typical implementation, the vicinity of a seaport is covered by a wireless communication network (e.g., a cellular network). When a vessel approaches the port, wireless terminals on-board the vessel will enter the coverage area of the wireless network and will typically begin to interact (e.g., register) with the network. This interaction causes the different nodes of the wireless network to generate network events.

In some embodiments described herein, some or all of the network events are intercepted and provided to a monitoring center. The monitoring center determines which of the intercepted network events correspond to terminals that are located on board the vessel, and automatically identifies the country of origin of each terminal. In some embodiments, the monitoring center recognizes the on-board terminals by extracting location information (e.g., Serving Area Identifiers—SAI or cell identifiers —CELL_ID) from the network events, and identifies the country of origin of each terminal by extracting Country Code (CC) fields from the network events.

The methods and systems described herein enable security authorities to detect suspicious scenarios quickly and automatically, and to issue alerts instantly when needed. The identity verification processes described herein are performed remotely, without a need to physically approach the vehicle. The on-board terminals are typically unaware of the process.

System Description

FIG. 1 is a schematic, pictorial illustration of a port security system 20, in accordance with an embodiment of the present disclosure. System 20 automatically identifies the country of origin of wireless terminals 32 used by mobile users 24 (e.g., passengers or crew) on board a vessel 28 that approaches or docks at a port. The system compares the identified countries of origin of the terminals with a-priori identity information regarding the vessel, such as the vessel's country or port of origin. If the system detects an inconsistency or mismatch between the identified country of origin of the terminals and the known identity information of the vessel, it invokes appropriate action.

System 20 identifies the country of origin of the on-board terminals by intercepting communication between the terminals and a wireless communication network, which covers the port area (and often covers a certain stretch of water in the vicinity of the port, as well). The wireless network comprises base stations (BTSs) 36, which communicate with terminals 32. Base stations 36 are connected to a terrestrial network 40, which typically comprises Base Station Controllers (BSCs), Mobile Switching Centers (MSCs) and other nodes, as is known in the art.

The wireless communication network may comprise any suitable network, such as, for example, a Global System for Mobile communications (GSM) or Universal Mobile Telecommunications Service (UMTS) network. The nodes of network 40 are addressed in greater detail in FIG. 2 below. Terminals 32 may comprise mobile phones, wireless-enabled computing devices such as mobile computers or Personal Digital Assistants (PDAs), or any other suitable communication or computing devices having wireless communication capabilities.

When vessel 28 approaches the port (and enters the coverage area of the wireless network), the wireless terminals 32 on board typically initiate communication with base stations 36. Typically, the terminals will register with the network automatically as they enter the network's coverage area. Communication initiation does not necessarily mean that the user of the terminal is involved or even aware of the process. In addition, users 24 may conduct calls via the wireless network or otherwise operate terminals 32. Thus, when vessel 28 approaches the port, the wireless network generates network events related to the wireless terminals located on board.

System 20 comprises a monitoring center 44, which is connected to network 40. The monitoring center processes the network events that are generated by the communication initiation with terminals 32. Using methods that are described hereinbelow, the monitoring center automatically identifies the country of origin of each on-board terminal 32 based on the network events. The monitoring center compares this information to a-priori information regarding the identity of the vessel. If at least some of the countries of origin of the on-board terminals does not match the a-priori identity information of the vessel, the monitoring center issues an alert and/or invokes appropriate action.

The a-priori identity information of the vessel may be indicative of, for example, the vessel's port of origin or country of origin. Alternatively, the identity information may comprise any other suitable information regarding the vessel.

The monitoring center may apply various rules and criteria for determining inconsistencies between the identity of the vessel and the countries of origin of the terminals. For example, an inconsistency may be declared if the country of origin of one or more on-board terminals is different from the country of origin of the vessel. Another rule may specify that an alert is to be triggered only if the number of inconsistent terminals exceeds a certain threshold. Additionally or alternatively, the monitoring center may trigger an alert when the identified country of origin of one or more of the terminals belongs to a "black list" of countries. The list may comprise countries that are on hostile terms with the country operating system 20, for example. Further alternatively, the monitoring center may apply any other criteria for defining a mismatch between the identity information of the vessel and the countries of origin of the on-board terminals.

FIG. 2 is a block diagram showing details of port security system 20 and network 40, in accordance with an embodiment of the present disclosure. As is well-known in the art, network 20 comprises BTSs 36, which are controlled by a BSC 64 (also referred to as a Radio Network Controller—RNC). The BSC is connected to one or more MSCs 68. The network further comprises a Home Location Register (HLR) 72. One of the MSCs in network 40 serves as a Gateway MSC (GMSC) 76, for communicating with networks external to network 40. In the exemplary network configuration of FIG. 2, GMSC 76 communicates with a network of an international communication service provider for providing roaming services to terminals from foreign countries.

When a certain terminal 32 on board vessel 28 interacts with BTS 36, the different nodes of network 40 generate network events on the interfaces among them. System 20 intercepts the network events using a passive probe 48. Probe 48 can be configured to intercept the network events on a desired interface in network 40, such as the interface between the BSC and MSC, the interface between the MSC and HLR and the interface between the GMSC and the international service provider's network.

The network events intercepted by probe 48 are provided to monitoring center 44. The monitoring center comprises an interface 52 for communicating with network 40 via probe 48, and a processor 56 that carries out the methods described herein. Processor 56 interacts with an operator of the monitoring center via an input/output device, such as an operator console 60. For example, the operator may provide the a-priori identity information of the vessel to processor 56 using console 60. As another example, processor 56 may issue alerts to the operator using console 60 upon detecting a mismatch between the identity of the vessel and the country of origin of the terminals or upon detecting arrival of a terminal whose country of origin is regarded hostile. Additionally or alternatively, the monitoring center may comprise other interfaces (not shown) to operators or to other systems for issuing alerts and/or invoking actions.

Typically, processor 56 comprises a general-purpose computer, which is programmed in software to carry out the functions described herein. The software may be downloaded to the computer in electronic form, over a network, for example, or it may, alternatively or additionally, be provided and/or stored on tangible media, such as magnetic, optical, or electronic memory.

Although the embodiments described herein refer to a system that is deployed in a seaport for verifying wireless terminals on board ships, the methods and systems described herein are in no way limited to seaports and ships and may be used with various other types of vehicles. For example, system 20 can be deployed in or around an airport, for verifying wireless terminals on board landing aircraft. As another example, the system can be deployed in a train station, bus depot or border crossing terminal, for verifying wireless terminals on board a train or a bus.

Country of Origin Identification of On-Board Terminals

In order to apply the identity verification methods described herein to a given terminal, processor 56 (1) determines that the terminal is located on-board vessel 28 with high likelihood, and (2) identifies the country of origin of the terminal. Typically, these two tasks can be carried out using information that is intercepted from the BSC-MSC interface in network 40. In some cases, however processor 56 further correlates network events from the BSC-MSC interface with network events on the MSC-GMSC or MSC-HLR interface, as will be explained below.

The interface between BSC 64 and MSC 68 may use various protocols, depending on the network type. In GSM networks, for example, the BSC-MSC interface typically uses an A-interface protocol, as in known in the art. In UMTS networks, this interface is denoted Iu (IuCS or IuPS). In both GSM and UMTS networks, the interface between the MSC and the GMSC typically uses a MAP-E protocol, and the interface between the MSC and HLR uses the MAP-C,D protocols.

Typically, some of the network events on the BSC-MSC interface pertaining to a given terminal specify the country of origin of the terminal, as well as location information that can be used to determine that the terminal is on board the vessel. This information is comprised, for example, in the first location update triggered in the wireless network when the terminal first roams into the network. Processor 56 extracts the country of origin information and location information from the network events, and uses this information to determine that the given terminal is indeed on board the vessel, and to recognize the terminal's country of origin.

Such network events usually specify the International Mobile Subscriber Identity (IMSI) of the terminal, which comprises a Country Code (CC) field indicating the country of origin of the terminal.

Location information can be specified in network events in different ways. In GSM networks, for example, the network events specify a CELL_ID indicating the cell (BTS and sector) via which the terminal communicates with the wireless network. In UMTS networks, the network events specify a Serving Area Identifier (SAI) that can be used as location information. Thus, the network events on the BSC-MSC interface provide an indication as to the location of the terminal. Since the BTS layout of the wireless network is known, processor 56 can determine with high likelihood whether the terminal in question is located on board vessel 28 based on the extracted location information. For example, the processor may hold a list of one or more cells that cover the vicinity of vessel 28, and regard a terminal that is served by these cells as being possibly located on board the vessel.

In some embodiments, processor 56 correlates the network events on the BSC-MSC interface with network events, pertaining to the same terminal, on the MSC-GMSC and/or MSC-HLR interfaces. Each network event on the MSC-GMSC and/or MSC-HLR interface comprises both the IMSI and the Mobile Systems International Subscriber Identity Number (MSISDN) of the terminal. The MSISDN of the terminal has the format of the dialed telephone number of the terminal, and is therefore usually known to the subscriber carrying the terminal. Thus, the MSISDN is sometimes helpful in questioning or otherwise verifying the identity of the person carrying the terminal.

Additionally, since the MSISDN of the terminal also comprises the Country Code (CC) field indicating the country of origin of the terminal, processor 56 can also identify the country of origin of the terminal by extracting the CC field of the network events related to this terminal on the MSC-GMSC and/or MSC-HLR interfaces.

In summary, network events on the BSC-MSC interface indicate the terminal's location and country of origin, whereas network events on the MSC-GMSC/HLR-MSC interfaces indicate the terminal's country of origin (CC) and MSISDN to be used for subsequent investigation. In order to establish that a given terminal is located on board the vessel and to identify the terminal's country of origin, processor 56 uses the location information and CC information conveyed in the network events on the BSC-MSC interface. In order to further establish the terminal's MSISDN, processor 56 correlates network events from the BSC-MSC and MSC-GMSC/MSC-HLR interfaces that relate to the same terminal. In some embodiments, the processor correlates the network events from the two interfaces by associating network events having the same IMSI values, since the terminal's IMSI is reported in both interfaces.

Identity Verification Method Description

FIG. 3 is a flow chart that schematically illustrates a method for verifying identities of wireless terminals on-board a vessel, in accordance with an embodiment of the present disclosure. The method begins with processor 56 of monitoring center 44 accepting identity information regarding the vessel, at a vessel identification step 80.

When the vessel approaches or docks at the port, on-board terminals 32 interact (e.g., register) with the local wireless network, at a network interaction step 84. The interaction between terminals 32 and the wireless network produces network events (such as first registration or location update in the roaming network) over the different interfaces of network 40, as explained above. Passive probe 48 intercepts some of these network events, at an interception step 88. Probe 48 provides the intercepted network events to monitoring center 44.

Processor 56 in monitoring center 44 detects the on-board terminals and automatically identifies their countries of origin using the intercepted network events. The processor extracts location information from the network events on the BSC-MSC interface, at a first extraction step 92. The location information may comprise, for example, a CELL_ID or SAI, as explained above. Using the location information, processor 56 determines which terminals are located on board the vessel.

Processor 56 extracts the Country Code (CC) information from the network events on the BSC-MSC interface, so as to establish the countries of origin of the on-board terminals, at a second extraction step 96.

Processor 56 checks whether the countries of origin of the on-board terminals match the identity information of the vessel, at a match checking step 100. The processor may apply any suitable criteria for detecting a match or a mismatch, as explained above. If the countries of origin of the on-board terminals match the identity information of the vessel, the system continues to operate normally, at a normal operation step 104.

Otherwise, i.e., if the processor detects a mismatch between the countries of origin of the on-board terminals and the identity information of the vessel or a hostile country of origin, the processor triggers an alert, at an alerting step 108. In some embodiments, the processor issues an alert to an operator of the monitoring center using console 60.

In some embodiments, processor 56 correlates the network events obtained from the BSC-MSC and MSC-GMSC/HLR-MSC interfaces. The processor associates network events from the two interfaces that pertain to the same terminal, by associating events having the same IMSI value. Having correlated the events, the processor can determine for each IMSI (1) whether the terminal is located on board the vessel with high likelihood, (2) the country of origin of the terminal, and (3) the MSISDN of the terminal.

The embodiments described herein mainly address system configurations in which network events are intercepted using passive means. In alternative embodiments, however, system performance can be enhanced by triggering network events using active means, as are known in the art.

It will thus be appreciated that the embodiments described above are cited by way of example, and that the present disclosure is not limited to what has been particularly shown and described hereinabove. Rather, the scope of the present disclosure includes both combinations and sub-combinations of the various features described hereinabove, as well as variations and modifications thereof which would occur to persons skilled in the art upon reading the foregoing description and which are not disclosed in the prior art.

The invention claimed is:

1. A security method, comprising:
   accepting identity information regarding a vehicle;
   intercepting communication between one or more wireless communication terminals located on board the vehicle and a wireless communication network;
   processing the intercepted communication so as to identify respective countries of origin of the terminals;
   making a comparison between the countries of origin of the terminals and the identity information of the vehicle; and
   invoking an action responsively to the comparison.

2. The method according to claim 1, wherein making the comparison comprises detecting an inconsistency between the identity information of the vehicle and one or more of the countries of origin of the terminals.

3. The method according to claim 1, wherein processing the intercepted communication comprises processing network events occurring in the wireless communication network responsively to the communication.

4. The method according to claim 3, wherein processing the network events comprises extracting from the network events first information indicative of locations of the terminals, and further extracting from the network events second information indicative of the countries of origin of the terminals.

5. The method according to claim 4, wherein the first information comprises one of a Serving Area Identifier (SAI) and a cell identifier (CELL_ID) specified in the network events.

6. The method according to claim 4, wherein the second information comprises Country Code (CC) fields of International Mobile Subscriber Identities (IMSI) specified in the network events.

7. The method according to claim 4, wherein processing the network events comprises extracting the first and second information pertaining to a given terminal from first network events sent over a first interface in the wireless communication network, and extracting a Mobile Systems International Subscriber Identity Number (MSISDN) of the given terminal from second network events sent over a second interface in the wireless communication network, which is different from the first interface.

8. The method according to claim 7, wherein processing the network events comprises correlating a first subset of the first network events with a second subset of the second network events.

9. The method according to claim 8, wherein the network events in the first and the second subsets specify an identifier of the given terminal, and wherein correlating the first subset with the second subset comprises associating the first and second subsets responsively to the identifier.

10. The method according to claim 9, wherein the identifier comprises an International Mobile Subscriber Identity (IMSI).

11. A security apparatus, comprising:
   a network interface, which is connected to a wireless communication network and is operative to intercept communication between one or more wireless communication terminals located on board a vehicle and the wireless communication network; and
   a processor, which is coupled to accept identity information of the vehicle, to process the intercepted communication so as to identify respective countries of origin of the terminals, to make a comparison between the countries of origin of the terminals and the identity information of the vehicle, and to invoke an action responsively to the comparison.

12. The apparatus according to claim 11, wherein the processor is coupled to detect an inconsistency between the identity information of the vehicle and one or more of the countries of origin of the terminals, and to invoke the action responsively to the inconsistency.

13. The apparatus according to claim 11, wherein the network interface is operative to accept network events occurring in the wireless communication network responsively to the communication with the terminals, and wherein the processor is coupled to process the intercepted network events.

14. The apparatus according to claim 13, wherein the processor is coupled to extract from the network events first information indicative of locations of the terminals, and to further extract from the network events second information indicative of the countries of origin of the terminals.

15. The apparatus according to claim 14, wherein the first information comprises one of a Serving Area Identifier (SAI) and a cell identifier (CELL_ID) specified in the network events.

16. The apparatus according to claim 14, wherein the second information comprises Country Code (CC) fields of International Mobile Subscriber Identities (IMSI) specified in the network events.

17. The apparatus according to claim 14, wherein the processor is coupled to extract the first and second information pertaining to a given terminal from first network events sent over a first interface in the wireless communication network, and to extract a Mobile Systems International Subscriber Identity Number (MSISDN) of the given terminal from second network events sent over a second interface in the wireless communication network, which is different from the first interface.

18. The apparatus according to claim 17, wherein the processor is coupled to correlate a first subset of the first network events with a second subset of the second network events.

19. The apparatus according to claim 18, wherein the network events in the first and the second subsets specify an identifier of the given terminal, and wherein the processor is coupled to correlate the first subset with the second subset by associating the first and second subsets responsively to the identifier.

20. The apparatus according to claim 19, wherein the identifier comprises an International Mobile Subscriber Identity (IMSI).

* * * * *